E. B. CROCKER.
STOP PIN FOR GAGE DIALS.
APPLICATION FILED FEB. 3, 1921.
1,374,438.
Patented Apr. 12, 1921.
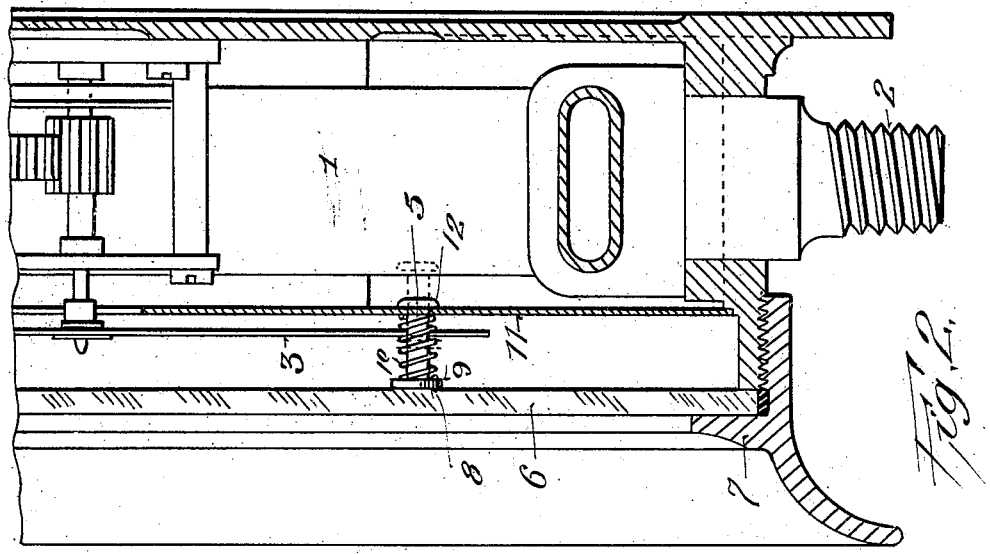
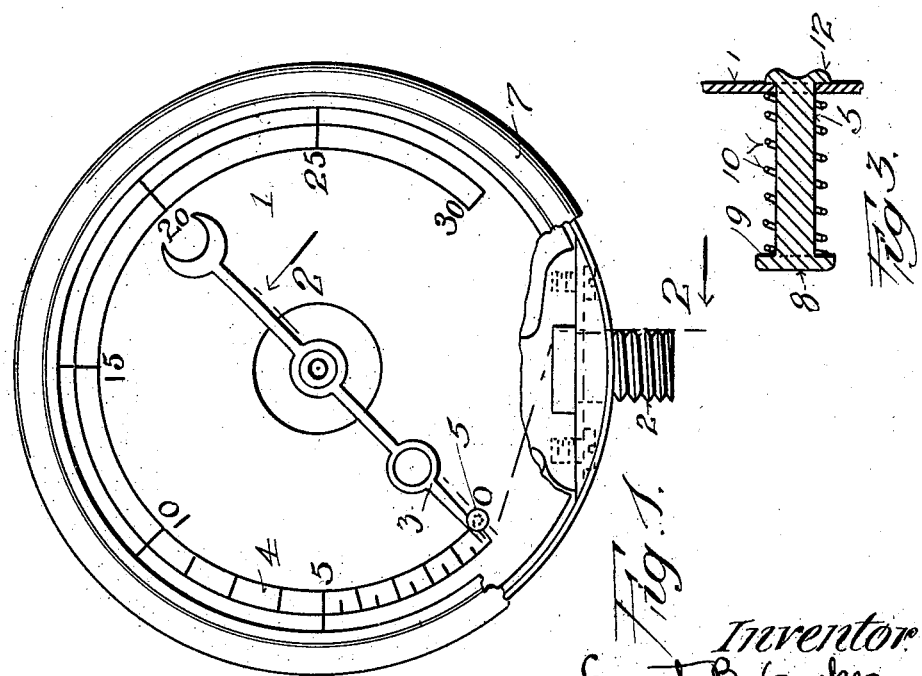

UNITED STATES PATENT OFFICE.

ERNEST B. CROCKER, OF STRATFORD, CONNECTICUT, ASSIGNOR TO MANNING, MAXWELL & MOORE, INC., OF NEW YORK, N. Y., A CORPORATION OF NEW JERSEY.

STOP-PIN FOR GAGE-DIALS.

1,374,438.    Specification of Letters Patent.    Patented Apr. 12, 1921.

Application filed February 3, 1921. Serial No. 442,027.

*To all whom it may concern:*

Be it known that I, ERNEST B. CROCKER, a citizen of the United States, residing at Stratford, county of Fairfield, State of Connecticut, have made a certain new and useful invention in Stop-Pins for Gage-Dials, of which the following is a specification.

This invention relates to stop pins for gage dials.

The object of the invention is to provide a stop pin which at all times will remain in contact with the glass or other cover of the gage to thereby insure the pin at all times stopping the gage hand on the graduated side of the dial. In other words, it is among the special objects of my invention to provide a stop pin for gage dials which will prevent the gage hand or pointer from slipping over the end thereof.

A further object of the invention is to provide a pin of the character described which is yieldably positioned relative to the dial glass or other cover to thereby prevent injury to the glass or other cover during shipment.

Further objects of the invention will appear more fully hereinafter.

The invention consists substantially in the construction, combination, location, and relative arrangement of parts, all as will be more fully hereinafter set forth as shown by the accompanying drawing, and finally pointed out in the appended claims.

Referring to the drawing,—

Figure 1 is a diagrammatic view in front elevation of a standard type of gage and dial, parts broken away, and provided with a stop pin embodying my invention.

Fig. 2 is an enlarged sectional view of a standard type of gage showing the stop pin of my invention in position therein.

Fig. 3 is a longitudinal sectional view of a stop pin embodying my invention.

The same part is designated by the same reference numeral wherever it occurs throughout the several views.

It is of common knowledge in the gage art that the pointer or hand of the gage frequently jumps over the usual stationary stop pin which is formed or secured to the dial of the gage to form a limit stop at zero position for the pointer or hand. It is the present practice that when the pointer jumps over the stop pin it is necessary to remove the glass and ring from the gage and disengage the hand from the back of the pin before placing the gage in operation. When gages, especially those employing glass or other fragile covers or plates are shipped, due to vibration and shock which is ordinarily imparted thereto during shipment, it has been necessary to utilize a stop pin which is out of contact with the glass cover to prevent, due to vibration and shock, the cover being shattered and broken on the end of the stop pin. Under such circumstances, however, the pointer very frequently has slipped over the stop pin through the space between the end thereof and the glass, and this has been a difficulty which has constantly been encountered, especially in shipment of gages of this character. In large sized gages where the hand is long and necessarily very flexible, its weight would cause the free end to bend toward the glass and in consequence jump over the stop pin, for it has not been practical to make a rigid stop pin come in direct contact with the glass for the reasons above stated, and many means have been suggested to overcome this difficulty, among them being providing the end of the stop pin with a flaring head, such as a tack head, but it has been found from actual experience that a very large per cent. of gages shipped in the ordinary manner reach their destinations with the hands or pointers in back of the stop pins.

In accordance with my present invention I provide a stop pin with a shouldered head, which at all times remains in contact with the glass, and the other side of the shoulder receiving thereon one end of a small coiled spring, the other end of which rests on the top of the dial and exerts an upward pressure on the pin so that the pin is maintained always in contact with the underside of the cover, and thereby closes all space between the end of the pin and the cover. In accordance with my invention I permanently affix the pin to the dial by flaring or brooming the end thereof behind the dial plate which prevents the pin from falling out, but at the same time allows the pin to slide through the dial plate yieldingly in accordance with the pressure that is exerted on the glass. Referring to the drawing as illustrating one embodiment of my invention I have shown at 1 a standard gage provided with the inlet 2, which communicates in the usual well known manner with the interior mechanism of the gage, which may be of any particular type to actuate the hand or pointer 3 over the graduated scale 4 in the usual well known way. At the zero point of the gage, as is customary, I position the stop pin of my invention designated 5. The gage is provided with the usual cover generally made of glass as indicated at 6, which is held in place in the usual well known manner by means of the ring 7. The stop pin 5 is provided with the head 8 to form a shoulder 9 thereover, against which rests one end of a coiled spring 10, the opposite end of which rests against the dial plate 11. It is understood that the stem of the pin 5 is mounted to slide freely against the tension of the spring 10 through a hole in the dial plate 11, and the pin is held in place in the dial in any suitable manner, for example, by the end 12 thereof being riveted or broomed sufficiently to prevent it passing through the hole in the dial. An easy method of splitting or brooming this end and which I have found to be satisfactory for this purpose is to previously have the pin drilled for a slight depth and to a diameter that leaves a thin rim to roll over, as clearly illustrated in Fig. 3, where it will be seen that the rim 12 prevents the pin 5 slipping through the dial plate 11.

I have found that the stop pin of my present invention is of great utility, especially when used in connection with enamel coated dials. In riveting in a permanent pin to an enameled dial there has always been difficulty due to chipping or crushing the enamel. With the resilient stop pin of my present invention it is obvious that the riveting of the pin to the enameled dial is eliminated so as to enable the same to be used efficiently in that connection, with the added advantage hereinbefore stated, of preventing the hand or pointer from jumping behind the stop pin.

It will be apparent that the stop pin of my invention can be made quite long as there is no interference on the underside of the dial with any of the mechanism parts of the gage of the usual standard construction, and in this way it is possible to have a variable length pin to accommodate for the distance between the top of the dial and the underside of the glass for all types of gages where otherwise it would be necessary to carry different length pins or make a subsequent operation of facing off the surplus length. It will be appreciated that this feature is one of exceeding merit in the manufacturing of gages employing stop pins of this character.

Many modifications and changes in details will readily occur to those skilled in the art without departing from the spirit and scope of my invention as defined in the claims, but having now set forth the object and nature of my invention, and having shown and described a structure embodying the principles of my invention, what I claim as new and useful and of my own invention and desire to secure by Letters Patent is,—

1. In a gage, the combination with a dial face and a hand operating thereover, a cover for said dial face, a stop pin for said hand, and means for maintaining said stop pin in contact with said cover.

2. In a gage, the combination with a dial face and a hand operating thereover, a cover for said dial face, a stop pin for said hand, and means for yieldingly maintaining said stop pin in contact with said cover.

3. In a gage, the combination with a dial, a hand operating thereover, of a stop pin for said hand, and means for yieldingly mounting said stop pin on said dial.

4. In a gage, the combination with a dial plate and a hand operating thereover, of a stop pin movably projecting through said dial, and means for yieldingly maintaining said stop pin in the farthest projected position from the face of said dial.

5. In a gage, the combination with a dial plate and a hand operating thereover, of a stop pin movably projecting through said dial, means for yieldingly maintaining said stop pin in the farthest projected position from the face of said dial, and means for limiting the movement of said pin relative to said dial.

6. The combination with a dial provided with an orifice therethrough, a stop pin slidably positioned in said orifice, and means for limiting the movement of said stop pin relative to said dial.

7. The combination with a dial provided with an orifice therethrough, of a stop pin slidably positioned in said orifice, means for limiting the movement of said stop pin relative to said dial, and means for yieldingly retaining said pin in its farthest projected position on one side of said dial.

8. The combination with a dial provided with an orifice therethrough, of a stop pin positioned in said orifice and provided at one end with a head, and a spring interposed between said dial and the head of said stop pin.

9. The combination with a dial provided with an orifice therethrough, a stop pin extending through said orifice on opposite sides of said dial, a coil spring surrounding said pin and positioned between one end thereof and said dial substantially as and for the purpose described.

10. The combination with a dial provided with an orifice therethrough, of a stop pin extending through said orifice on opposite sides of said dial, the ends of said pin being formed to prevent the said pin becoming separated from said dial.

11. The combination with a dial provided with an orifice therethrough, of a stop pin projecting through said orifice and provided at one end with a head, a coil spring surrounding the shank of said pin and extending between said head and the face of said dial, the opposite end of the pin being upset and positioned in back of said dial to prevent the pin from becoming separated from said dial.

In testimony whereof I have hereunto set my hand on this 25th day of January A. D., 1921.

ERNEST B. CROCKER.